United States Patent
Uziel et al.

(10) Patent No.: US 11,765,010 B2
(45) Date of Patent: Sep. 19, 2023

(54) CYCLIC SHIFT SELECTION FOR PHYSICAL SIDELINK CONTROL CHANNEL TRANSMISSION

(71) Applicant: QUALCOMM Incorporated, San Diego, CA (US)

(72) Inventors: Lior Uziel, Hod Hasharon (IL); Guy Wolf, Rosh Haayin (IL)

(73) Assignee: QUALCOMM Incorporated, San Diego, CA (US)

( * ) Notice: Subject to any disclaimer, the term of this patent is extended or adjusted under 35 U.S.C. 154(b) by 333 days.

(21) Appl. No.: 17/074,792

(22) Filed: Oct. 20, 2020

(65) Prior Publication Data

US 2022/0123978 A1 Apr. 21, 2022

(51) Int. Cl.
| | |
|---|---|
| H04L 27/26 | (2006.01) |
| H04W 4/40 | (2018.01) |
| H04W 72/0446 | (2023.01) |
| H04W 72/0453 | (2023.01) |
| H04W 72/1263 | (2023.01) |
| H04W 72/20 | (2023.01) |
| H04W 92/18 | (2009.01) |

(52) U.S. Cl.
CPC .......... *H04L 27/2607* (2013.01); *H04W 4/40* (2018.02); *H04W 72/0446* (2013.01); *H04W 72/0453* (2013.01); *H04W 72/1263* (2013.01); *H04W 72/20* (2023.01); *H04W 92/18* (2013.01)

(58) Field of Classification Search
CPC . H04L 27/2607; H04L 5/0053; H04L 1/0078; H04W 4/40; H04W 72/0446; H04W 72/0453; H04W 72/1263; H04W 72/20; H04W 92/18
See application file for complete search history.

(56) References Cited

U.S. PATENT DOCUMENTS

| | | |
|---|---|---|
| 2011/0280284 A1 | 11/2011 | Nakao et al. |
| 2019/0090250 A1* | 3/2019 | Lee ........................ H04W 72/02 |
| 2021/0112544 A1* | 4/2021 | Chen ..................... H04W 72/21 |

(Continued)

FOREIGN PATENT DOCUMENTS

EP 3432657 A1 1/2019

OTHER PUBLICATIONS

International Search Report and Written Opinion—PCT/US2021/046953—ISA/EPO—dated Nov. 24, 2021.

(Continued)

*Primary Examiner* — Mounir Moutaouakil
(74) *Attorney, Agent, or Firm* — Patterson & Sheridan, L.L.P.

(57) ABSTRACT

Certain aspects of the present disclosure provide techniques for cyclic shift selection for physical sidelink control channel retransmissions. A method that may be performed by a first user equipment (UE) includes monitoring one or more sidelink control information (SCI) transmissions from one or more second UEs. The method generally includes determining, based on the one or more SCI, whether one or more collisions occur between one or more retransmissions of the one or more SCI transmissions by the one or more second UEs and a scheduled SCI transmission by the first UE. The method generally includes selecting a cyclic shift to use for the scheduled SCI transmission by the first UE based at least on the determination.

27 Claims, 12 Drawing Sheets

(56) References Cited

U.S. PATENT DOCUMENTS

| | | | |
|---|---|---|---|
| 2021/0306992 A1* | 9/2021 | Uziel | H04L 5/0053 |
| 2021/0359788 A1* | 11/2021 | Uziel | H04W 72/20 |
| 2022/0232575 A1* | 7/2022 | Lee | H04W 52/383 |
| 2022/0248425 A1* | 8/2022 | Lee | H04W 4/40 |
| 2022/0271872 A1* | 8/2022 | Hu | H04L 5/0053 |
| 2022/0303985 A1* | 9/2022 | Miao | H04W 72/02 |
| 2023/0039128 A1* | 2/2023 | Basu Mallick | H04W 4/70 |

OTHER PUBLICATIONS

LG Electronics: "Discussion on Physical Layer Structure for NR Sidelink," 3GPP Draft, 3GPP TSG RAN WG1 #98, R1-1908900 Discussion on Physical Layer Structure for NR Sidelink, 3rd Generation Partnership Project (3GPP), Mobile Competence Centre, 650, Route Des Lucioles, F-06921, Sophia-Antipolis Cedex, France, vol. RAN WG1. No. Prague. CZ, Aug. 26, 2019-Aug. 30, 2019, Aug. 17, 2019 (Aug. 17, 2019), XP051765508, 34 pages.

* cited by examiner

| Parameters | | Sidelink Transmission | |
|---|---|---|---|
| | | PSCCH | |
| | | Sidelink Transmission Modes 1 and 2 | Modes 3 and 4 |
| Group hopping | $n_{ID}^{RS}$ | disabled | disabled |
| | $n_s$ | - | - |
| | $f_{ss}$ | 0 | 8 |
| Sequence Hopping | | disabled | disabled |
| Cyclic Shift | $n_{cs,\lambda}$ | 0 | $\{0, 3, 6, 9\}$ |
| Orthogonal Sequence | $[w^\lambda(\cdot)]$ | $[+1 +1]$ | $[+1 +1 +1 +1]$ |
| Reference Signal Length | $M_{sc}^{RS}$ | $M_{sc}^{PSCCH}$ | $M_{sc}^{PSCCH}$ |
| Number of Layers | $v$ | 1 | 1 |
| Number of Antenna Ports | $P$ | 1 | 1 |

FIG. 8

CYCLIC SHIFT SELECTION FOR PHYSICAL SIDELINK CONTROL CHANNEL TRANSMISSION

BACKGROUND

Field of the Disclosure

Aspects of the present disclosure relate to wireless communications, and more particularly, to techniques for cyclic shift selection for physical sidelink control channel transmission.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved cyclic shift selection for physical sidelink control channel (PSCCH) retransmission.

Certain aspects of the subject matter described in this disclosure can be implemented in a method for wireless communication by a first user equipment (UE). The method generally includes monitoring one or more sidelink control information (SCI) transmissions from one or more second UEs. The method generally includes determining, based on the one or more SCI, whether one or more collisions occur between one or more retransmissions of the one or more SCI transmissions by the one or more second UEs and a scheduled SCI transmission by the first UE. The method generally includes selecting a cyclic shift to use for the scheduled SCI transmission by the first UE based at least on the determination.

Certain aspects of the subject matter described in this disclosure can be implemented in an apparatus for wireless communication. The apparatus generally includes at least one processor and a memory coupled to the at least one processor. The memory generally includes code executable by the at least one processor to cause the apparatus to monitor one or more SCI transmissions from one or more UEs. The memory generally includes code executable by the at least one processor to cause the apparatus to determine, based on the one or more SCI, whether one or more collisions occur between one or more retransmissions of the one or more SCI transmissions by the one or more UEs and a scheduled SCI transmission by the apparatus. The memory generally includes code executable by the at least one processor to cause the apparatus to select a cyclic shift to use for the scheduled SCI transmission by the apparatus based at least on the determination.

Certain aspects of the subject matter described in this disclosure can be implemented in an apparatus for wireless communication. The apparatus generally includes means for monitoring one or more SCI transmissions from one or more UEs. The apparatus generally includes means for determining, based on the one or more SCI, whether one or more collisions occur between one or more retransmissions of the one or more SCI transmissions by the one or more UEs and a scheduled SCI transmission by the apparatus. The apparatus generally includes means for selecting a cyclic shift to use for the scheduled SCI transmission by the apparatus based at least on the determination.

Certain aspects of the subject matter described in this disclosure can be implemented in a computer readable medium storing computer executable code thereon for wireless communication by a first UE. The computer readable medium generally includes code for monitoring one or more SCI transmissions from one or more second UEs. The computer readable medium generally includes code for determining, based on the one or more SCI, whether one or more collisions occur between one or more retransmissions of the one or more SCI transmissions by the one or more second UEs and a scheduled SCI transmission by the first UE. The computer readable medium generally includes code for selecting a cyclic shift to use for the scheduled SCI transmission by the first UE based at least on the determination.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 8 is a table of parameters used for sidelink transmissions in C-V2X systems, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
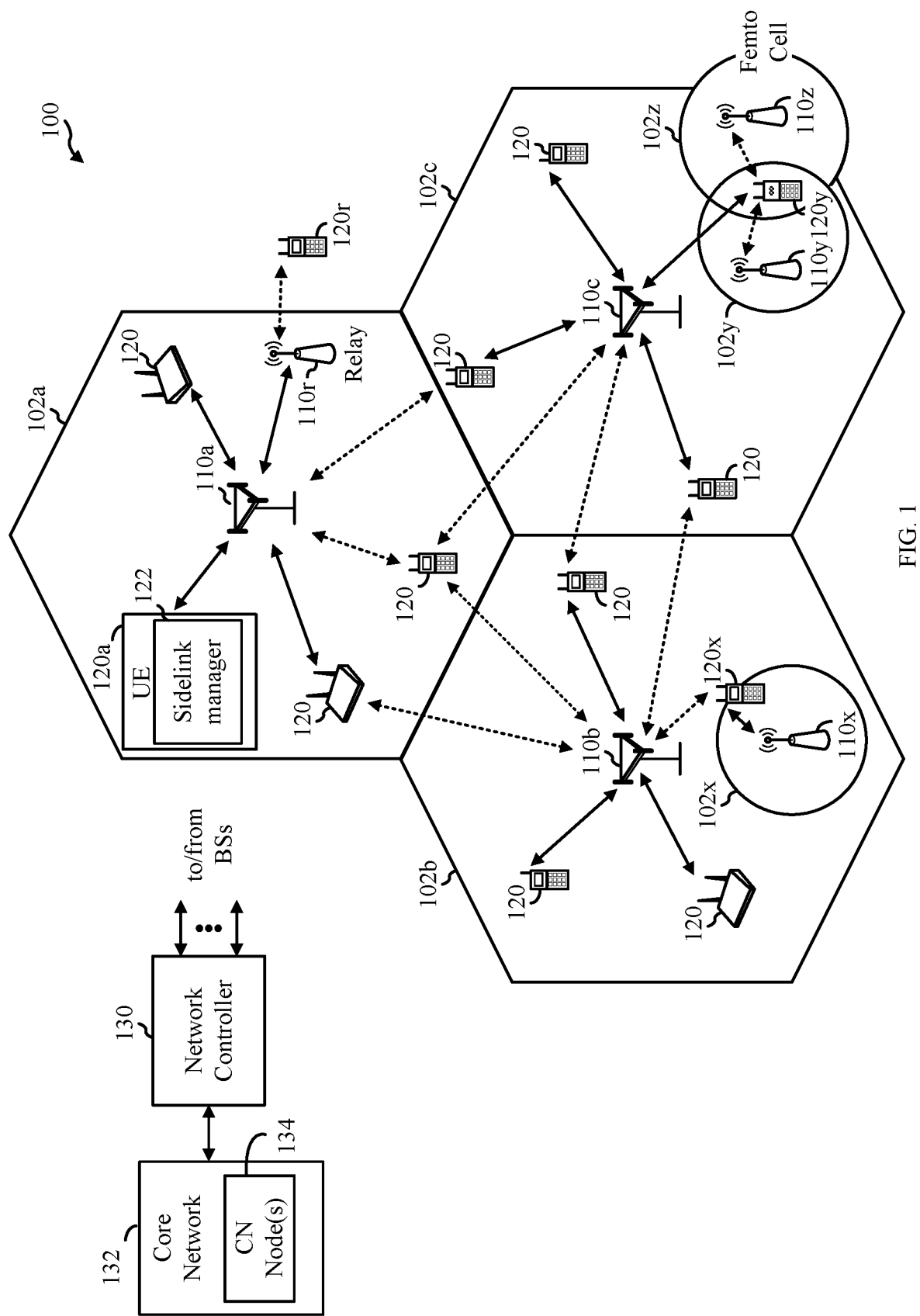
FIG. 1 is a block diagram conceptually illustrating an example telecommunications system, in accordance with certain aspects of the present disclosure.

Aspects of the present disclosure provide apparatus, methods, processing systems, and computer readable mediums for cyclic shift selection for physical sidelink control channel (PSCCH) retransmissions, such as in cellular vehicle-to-anything (C-V2X) direct communications.

In C-V2X systems, user equipment (UE), such as vehicular UEs, may directly communicate with each other using time-frequency resources autonomously selected by the UE. However, the autonomous selection of resources can cause problems when two UEs select the same resources, thereby causing packet collisions or packet overlaps. For example, in some scenarios, a UE may be "hidden" during channel sensing and an initial resource selection (e.g., an autonomous semi-persistent scheduling (SPS) resource selection), and may be interfering.

Aspects of the present disclosure provide techniques for selecting cyclic shifts for PSCCH retransmissions. In some examples, a UE monitors for sidelink control information (SCI) and corresponding SCI transmissions of other UEs and for any collisions between its transmissions (and retransmissions) and transmissions (and retransmissions) from other UEs. The UE may select a cyclic shift for its own SCI transmission (either an initial SCI transmission or a SCI retransmission) based on whether there is a collision.

The following description provides examples of cyclic shift selection for PSCCH retransmissions in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the UEs 120 may be configured for cyclic shift selection for physical sidelink control channel (PSCCH) retransmission. As shown in FIG. 1, the UE 120a includes a sidelink manager 122. The sidelink manager 122 may be configured to monitor one or more sidelink control information (SCI) transmissions from one or more second UEs; determine, based on the one or more SCI, whether one or more collisions occur between one or more retransmissions of the one or more SCI transmissions by the one or more second UEs and a scheduled SCI transmission by the first UE; and select a cyclic shift to use for the scheduled SCI transmission by the first UE based at least on the determination, in accordance with aspects of the present disclosure.

Figure 2:
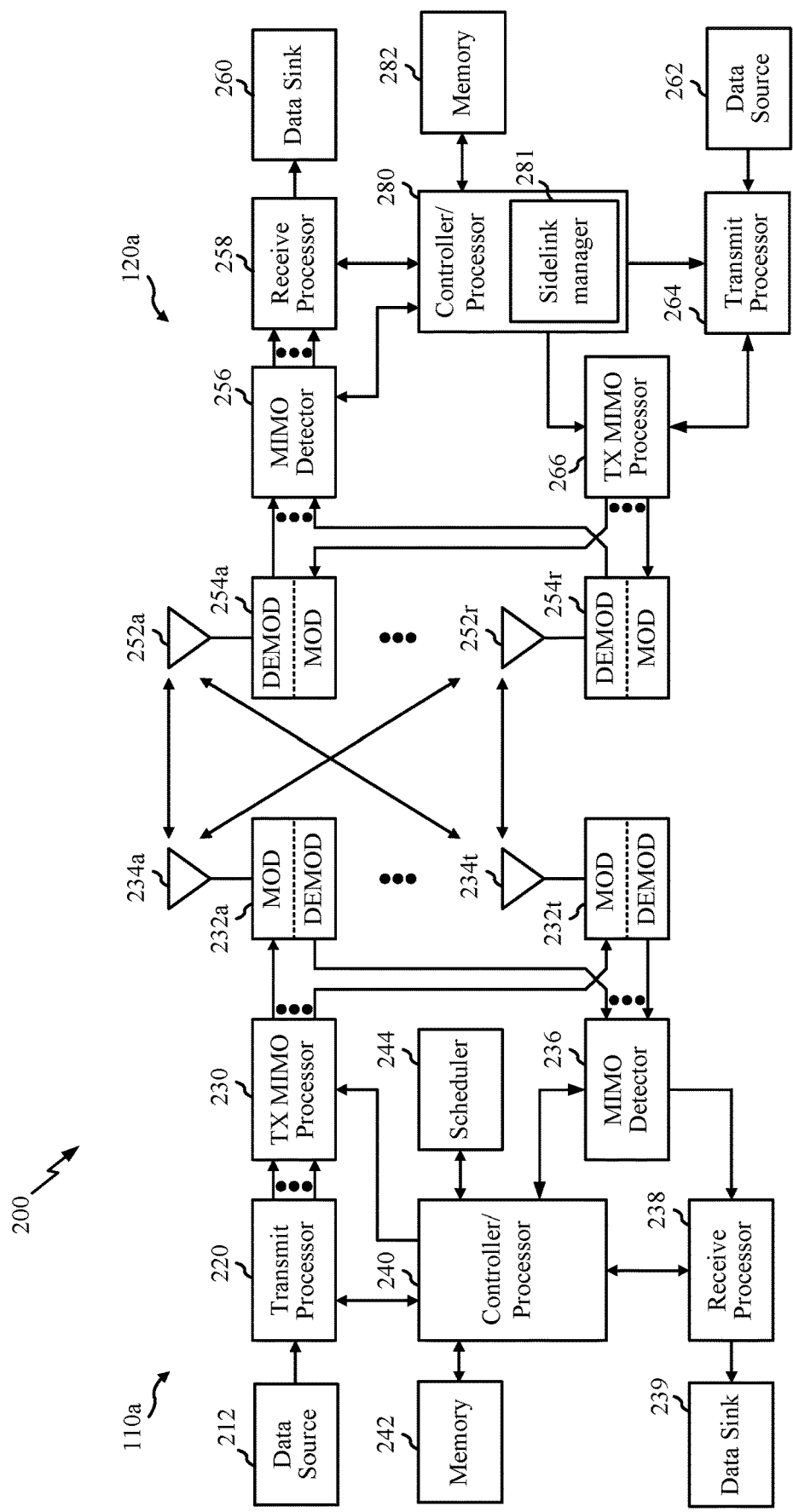
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators (MODs) in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238 may be used to perform the various techniques and methods described herein. As shown in FIG. 2, the controller/processor 280 of the UE 120a has a sidelink manager 281 that may be configured for cyclic shift selection for PSCCH retransmission, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
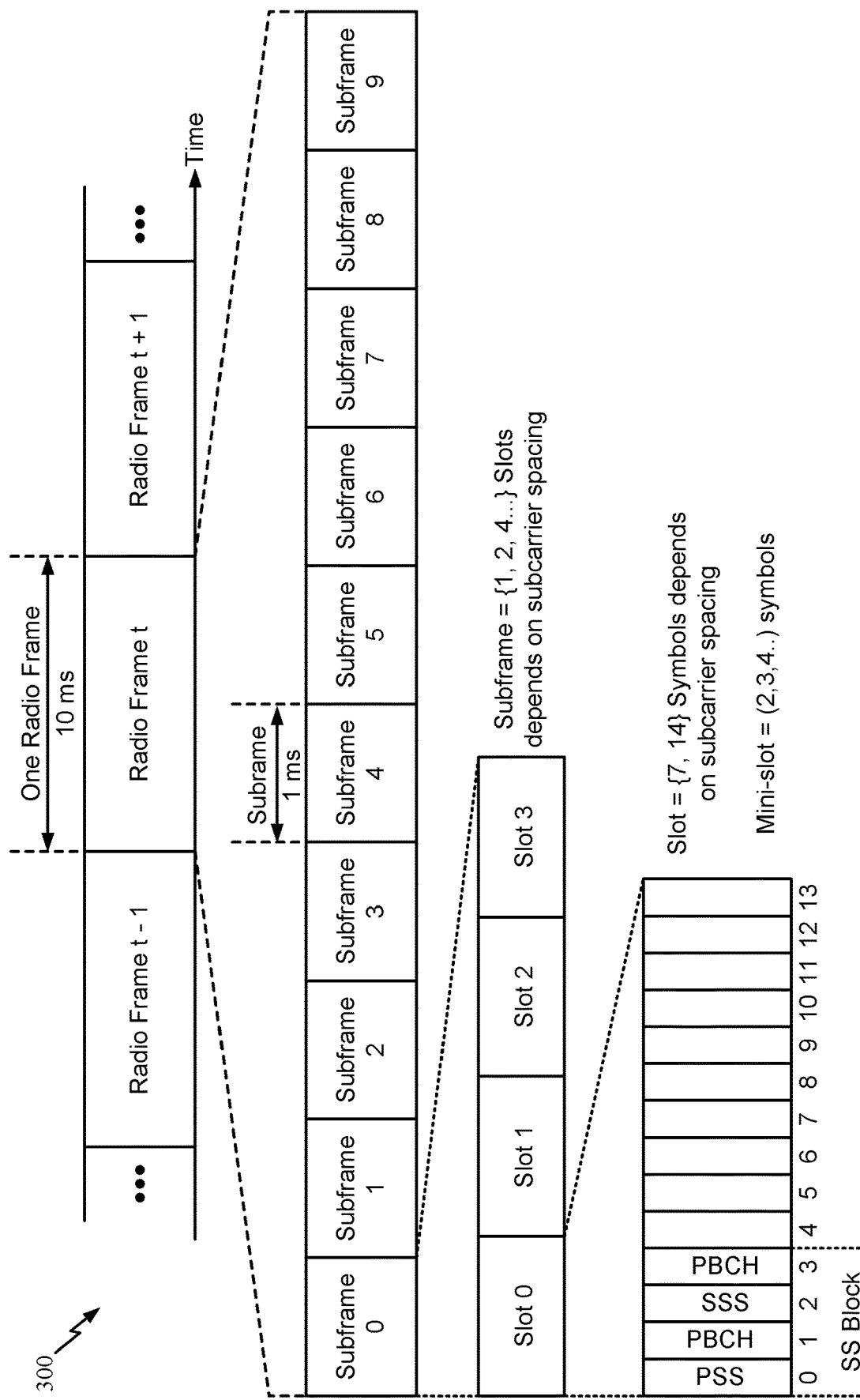
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some examples, the communication between the UEs 120 and BSs 110 is referred to as the access link. The access link may be provided via a Uu interface. Communication between devices may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as CSI related to a sidelink channel quality.

Figure 4:
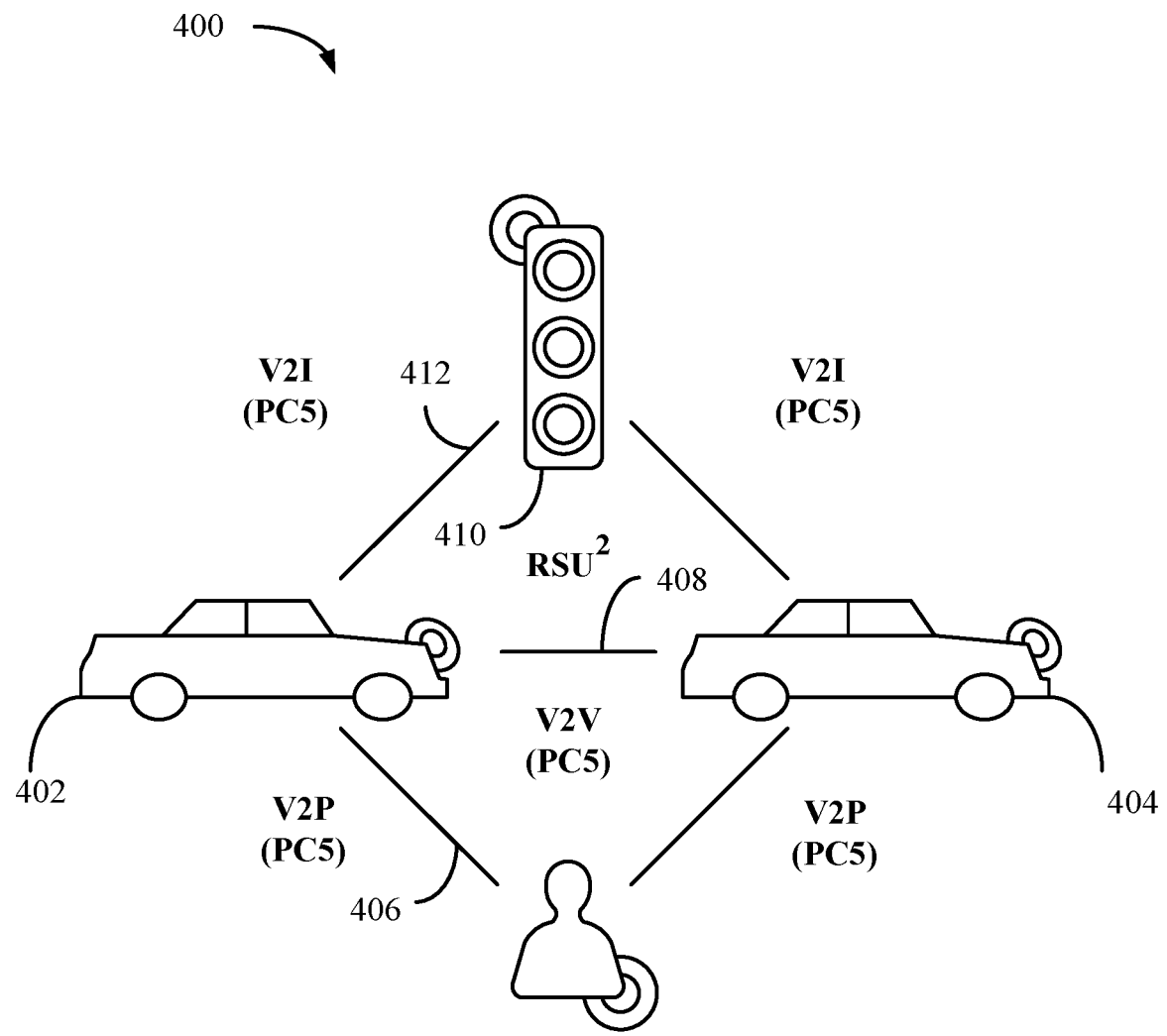
FIG. 4 illustrates an example vehicle-to-everything (V2X) communication system, in accordance with certain aspects of the present disclosure.
Figure 5:
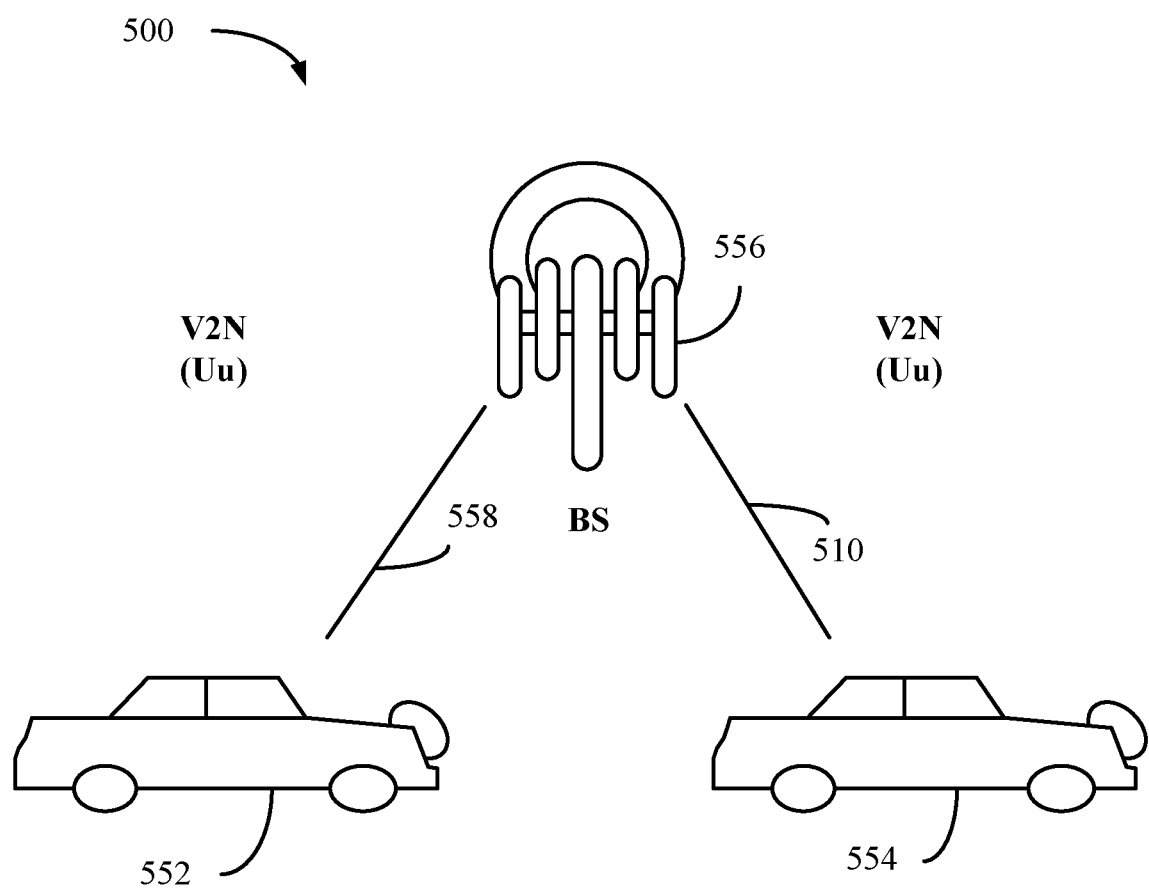
FIG. 5 illustrates another example V2X communication system, in accordance with certain aspects of the present disclosure.

FIG. 4 and FIG. 5 show diagrammatic representations of example vehicle-to-everything (V2X) systems, in accordance with some aspects of the present disclosure. For example, the vehicles shown in FIG. 4 and FIG. 5 may communicate via sidelink channels and may relay sidelink transmissions as described herein.

The V2X systems, provided in FIG. 4 and FIG. 5 provide two complementary transmission modes. A first transmission mode (also referred to as mode 4), shown by way of example in FIG. 4, involves direct communications (for example, also referred to as side link communications) between participants in proximity to one another in a local area. A second transmission mode (also referred to as mode 3), shown by way of example in FIG. 5, involves network communications through a network, which may be implemented over a Uu interface (for example, a wireless communication interface between a radio access network (RAN) and a UE).

Referring to FIG. 4, a V2X system 400 (for example, including vehicle to vehicle (V2V) communications) is illustrated with two vehicles 402, 404. The first transmission mode allows for direct communication between different participants in a given geographic location. As illustrated, a vehicle can have a wireless communication link 406 with an individual (vehicle-to-person (V2P)) (for example, via a UE) through a PC5 interface. Communications between the vehicles 402 and 404 may also occur through a PC5 interface 408. In a like manner, communication may occur from a vehicle 402 to other highway components (for example, highway component 410), such as a traffic signal or sign (vehicle-to-infrastructure (V2I)) through a PC5 interface 412. With respect to each communication link illustrated in FIG. 4, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 5 shows a V2X system 500 for communication between a vehicle 552 and a vehicle 554 through a network entity 556. These network communications may occur through discrete nodes, such as a BS (e.g., the BS 110a), that sends and receives information to and from (for example, relays information between) vehicles 552, 554. The network communications through vehicle to network (V2N) links 558 and 510 may be used, for example, for long range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NB-type RSUs have similar functionality as the Macro eNB/gNB. The Micro NB-type RSUs can utilize the Uu interface. UE-type RSUs can be used for meeting tight quality-of-service (QoS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

As mentioned above, aspects of the present disclosure relate to sidelink communications, which can include cellular V2X (C-V2X) communications. A C-V2X system may operate in various modes. An example mode, referred to as Mode 3, may be used when the UE is in an in-coverage area. In the Mode 3, the network may control allocation of resources for the sidelink UEs. In another example mode for V2X systems, referred to as Mode 4, the sidelink UEs may autonomously select resources (e.g., resource blocks (RBs)) used for transmissions to communicate with each other. For example, resources may be semi-persistent scheduling (SPS) resources. In some examples, the sidelink UEs can autonomously select resources based on an SPS algorithm. The SPS algorithm may be configured, hardcoded, or preconfigured at the UE. For example, the SPS algorithm may be based on an SPS algorithm defined in the 3GPP technical standards.

In some systems, a UE may select resources to transmit using a sensing mechanism. By sensing available and unavailable resources, the UE can select and transmit on vacant resources, which may reduce or prevent collisions. The sensing may involve power estimation (e.g., resource signal strength indicator (RSSI) measurements). The power estimation may exclude unmeasured subframes (e.g. due to previous transmissions). The resource selection may exclude resources based on expected conflict with other UE's transmissions. Hidden UEs; however, may be unaware of each other and, therefore, unable to exclude each other resources. Thus, transmissions by these UEs may collide on neighboring UEs.

In some cases, a "hidden terminal" scenario may occur due to the dynamically changing environment. For example, when the sidelink UE selects resources for transmissions (e.g., in the Mode 4), some other UEs (e.g., vehicles) may be hidden (e.g., undetected), such as when a channel sensing is performed. Thus, two (or more) UEs may (e.g., autonomously) select the same resources. Hidden terminal scenarios (leading to packet collision) may occur when UEs have overlapping coverage area while assigning RBs for transmission.

Figure 6A:
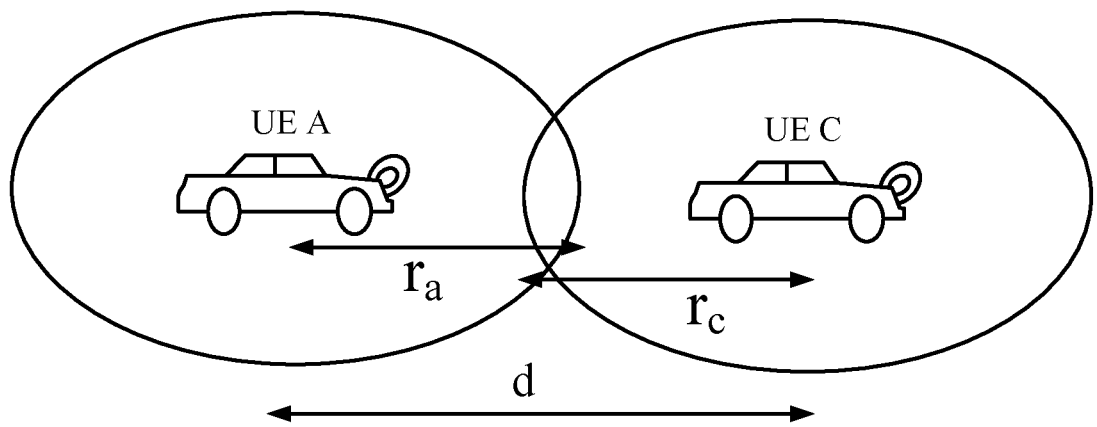
FIGS. 6A and 6B show example hidden UE scenarios, in accordance with certain aspects of the present disclosure.
Figure 6B:
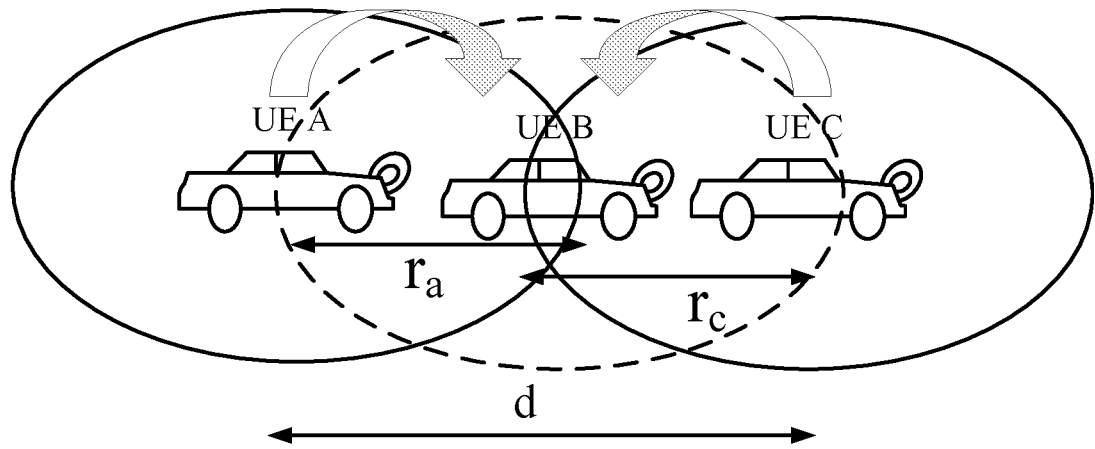

FIG. 6A illustrates a hidden terminal scenario. The UE A and UE C cannot sense each other's presence, for example, because these UEs are outside the coverage range of each other. As shown in FIG. 6A, the physical distance, d, between UE A and UE C is at least $r_A + r_C$, where $r_A$ is the radius of UEs A's coverage and $r_C$ is the radius of UE C's coverage. UE A does not know about the existence of UE C (the "hidden node"), and similarly, UE C does not know about the existence of UE A. Because UE A and UE C do not know about the other, both UEs may allocate/select the same time-frequency resources (some or all) (e.g., overlapping RBs) for transmission. In this case, UEs in the common area of UE A and UE C (A∩C), such as UE B shown in FIG. 6B) cannot decode the data transmitted from either UE A or UE C using the allocated resources, due to the packet collision.

Figure 7A:
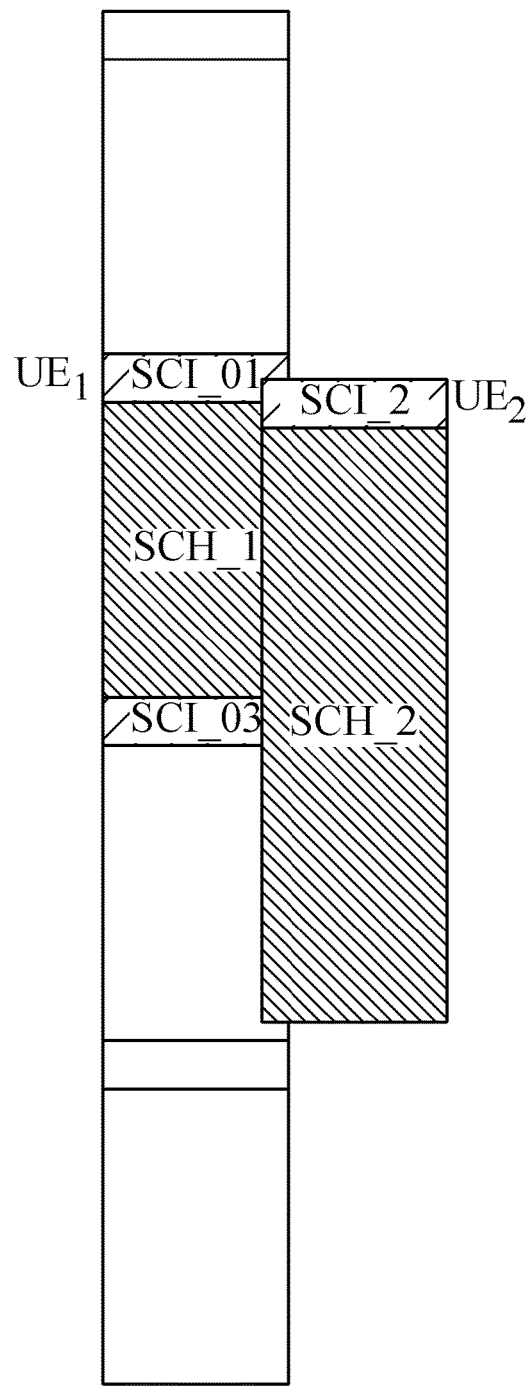
FIG. 7A illustrates example resources when assigning resource blocks in cellular V2X (C-V2X) direct communications with packet collision, in accordance with certain aspects of the present disclosure.
Figure 7B:
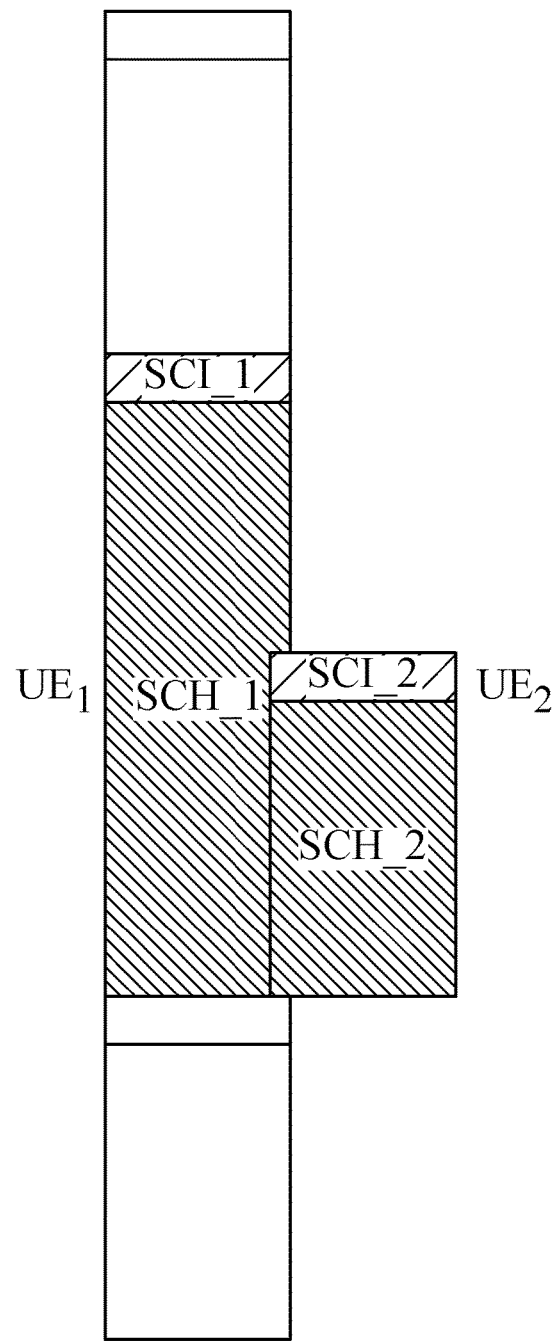
FIG. 7B illustrates example resources when assigning resource blocks in C-V2X direct communications with packet overlap, in accordance with certain aspects of the present disclosure.

Collisions and overlaps may be seen in congested scenarios. As used herein, overlap occurs when two or more UEs transmit control channel (e.g., PSCCH) and data channels (e.g., PSSCH) on the same resources and collision occurs when two or more UEs transmit control channels (PSCCH) on the same resources. FIG. 7A illustrates an example collision scenario and FIG. 7B illustrates an example overlapping scenario. During a collision, as shown in FIG. 7A, the PSCCH transmissions from UE1 and UE2 are transmitted on the same resources. During an overlap, as shown in FIG. 7B, the PSCCH and PSSCH transmissions from UE 1 and UE2 are transmitted using the same resources.

For both collisions and overlaps, if the UE1 and UE2 transmit PSCCH and PSSCH transmissions, other UEs may not detect the PSCCH (e.g., with sidelink control SCI). Although transmissions from two UEs are shown in FIGS. 7A and 7B, the system may involve sidelink transmissions from any number of UEs.

For PSCCH, bit processing may follow downlink control information (DCI) with no scrambling in cyclic redundancy check (CRC) attachment. Scrambling may be initialized with a constant (e.g., $c_{init}$=510). The PSCCH may use quadrature phase shift keying (QPSK) modulation. Layer mapping and precoding may use a single antenna port. SCI may be transmitted in the PSCCH and include a payload and un-coded bits. The same SCI may include the same transmitted symbols (e.g., coded, modulated, mapped symbols). FIG. 8 is an example table of parameters for reference signals for PSCCH transmissions (e.g., as defined in TS 36.211 Table 9.8-2). The reference signals used for PSSCH may not use group or sequence hopping and uses the same orthogonal code. The reference signals for PSSCH can have cyclic shifts that provide channel separation (e.g., four randomly selected values {0, 3, 6, 9}).

Figure 9:
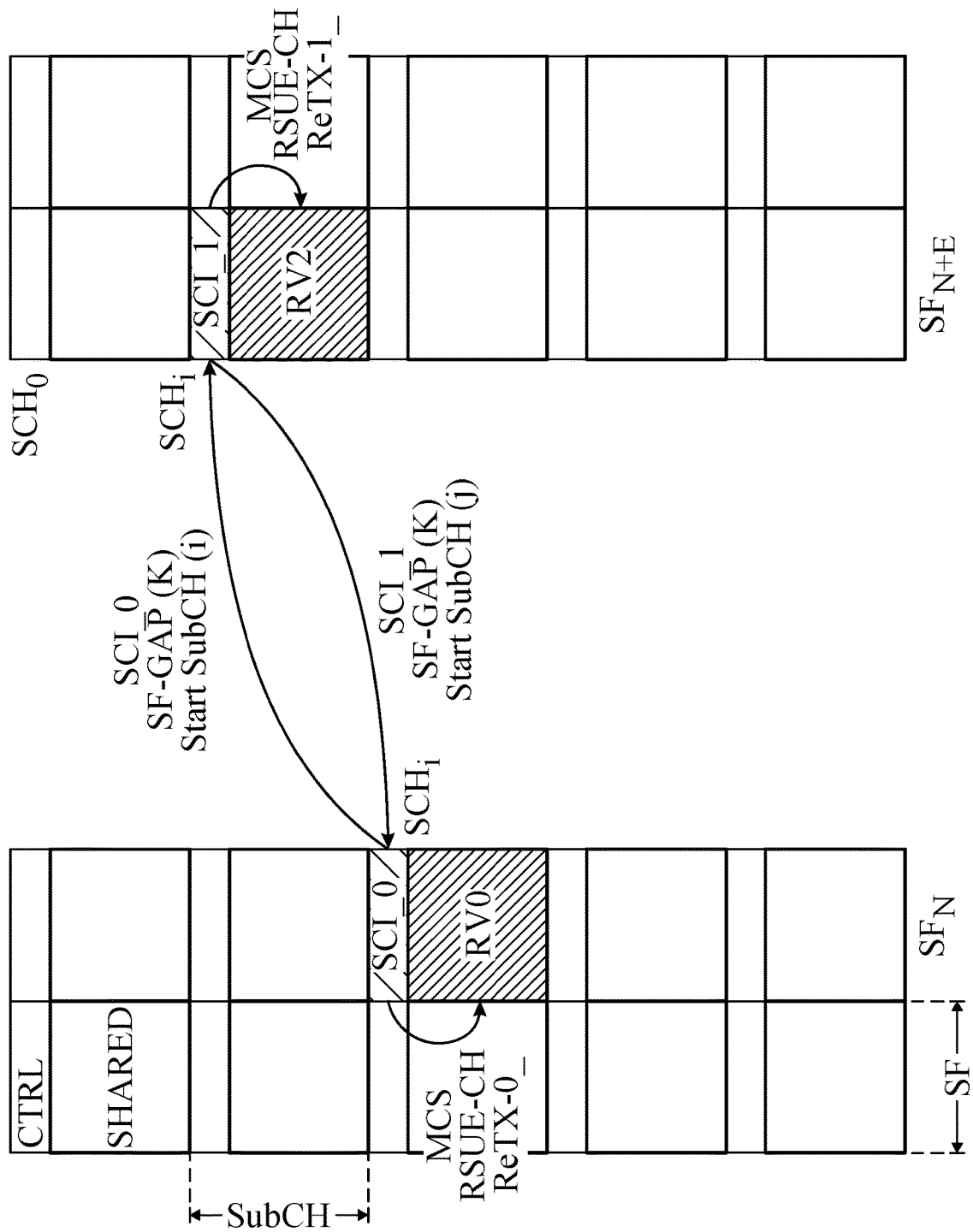
FIG. 9 illustrates example sidelink control information (SCI) transmission and retransmission, in accordance with certain aspects of the present disclosure.

Information regarding sidelink transmissions can be obtained from the SCI sent in the PSCCH. With SPS transmissions, each SPS transmission indicates a transmission period (e.g., 20/50/100/200 . . . 1000 subframes). In this case, information regarding transmissions can be determined from the indicated periodicity of the SPS transmissions. In another example, hybrid automatic repeat request (HARD) transmissions may involve binding mechanisms and controls (e.g., 1/2/ . . . 15 subframe gaps). For example, redundancy versions (e.g., $RV_0$, $RV_2$) may be associated (e.g., point to each other). Thus, information regarding one RV may be determined from information about another RV. FIG. 9 illustrates an example SCI RV pair.

In some systems (e.g., in TS 36.211 Section 9.8), for sidelink transmission modes 3 and 4 on the PSCCH, the cyclic shift to be applied is randomly selected from among {0, 3, 6, 9} in each PSCCH transmission and retransmission (e.g., according to TS 36.211 Section 14.2.1). Randomly selecting the cyclic shift may help to handle collisions.

Congestion in transmissions, such as collisions due to the hidden UE scenarios, can be detrimental to C-V2X communications and can lead to competition (e.g. Dedicated Short Range Communication (DSRC)) promotion. Congestion in transmissions may impact packet error rate (PER) and/or information age (IA). To deal with these collisions and overlaps, contention control, muting, and other techniques were developed to ease congestion implications (e.g., increasing inter-transmit time (ITT) on account of reducing the PER and IA).

Due to random nature of cyclic shift selection, a UE may receive colliding PSCCH transmissions with the same cyclic shift. A collision of PSCCH transmissions with the same cyclic shift may to the UE misdetecting (i.e., not detecting) the PSCCH. Thus, in some cases, when the UE autonomously selects resources, the UE will not exclude the resources (e.g., sub-channels) of the non-detected PSCCH transmissions. Accordingly, congestion control effectiveness is decreased. Collisions may also cause measurements assisting link management (e.g. sync-time offset) to be missed. In some cases, because of misdetection of the PSCCH, the UEs may misdetect PSSCH transmissions because the sidelink control information points to the corresponding sidelink data transmission.

Collision of PSCCH transmissions with the same cyclic shift lead to the UE being unable to differentiate PSCCH transmissions. A UE with no prior knowledge may simply decode the strongest PSCCH, and unnecessarily lose PSCCH transmissions (and associated PSSCH) with lesser transmission strength where $RV_0$ passes its cyclic redundancy check (CRC).

Accordingly, what is needed are techniques and apparatus for cyclic shift selection for PSCCH transmissions and retransmissions in sidelink communications.

Example Cyclic Shift Selection for Physical
Sidelink Control Channel Transmission Aspects of the present disclosure provide cyclic shift selection for physical sidelink control channel (PSCCH) transmissions and retransmissions, such as in cellular vehicle to everything (C-V2X) communications. In certain aspects, a first user equipment (UE) monitors for a sidelink control indicator (SCI) transmissions from a second UE. The SCI transmissions from the second UE may collide one of the first UE's SCI transmission (either an initial transmission or a retransmission). Based on whether there is a collision of transmission, the first UE selects a cyclic shift to use for its transmissions. The selection of the cyclic shift may depend on whether there is a transmission and whether the transmissions are initial transmissions or retransmissions from either the first UE or the second UE.

Aspects of the present disclosure aim to prevent selection of the same cyclic shift on overlapping transmission by multiple UEs. Certain aspects of the present disclosure provide criteria for selecting the cyclic shift for PSCCH retransmissions.

According to certain aspects, the UE may transmit a PSCCH retransmission (e.g., a redundancy version, $RV_2$) on a resource with no known collisions. When there are no known collisions, the UE may select the same cyclic shift for the PSCCH retransmission as the cyclic shift that was randomly selected for the initial PSCCH transmission (e.g., $RV_0$). In some examples, the cyclic shift is randomly selected from a set of cyclic shifts, such as the set {0, 3, 6, 9}. When a cyclic shift is used for the retransmission, $CS_x$, that cyclic shift may be removed the set of non-used cyclic shifts.

In some aspects, the UE may transmit on the same resources that another UE (at least one other UE) uses for a PSCCH retransmission (e.g., a collision determined by the UE based on first detecting an SCI from the other UE). If the UE is sending an initial PSCCH transmission (e.g., $RV_0$) that collides with the PSCCH retransmission by the other UE, then the UE may randomly select a cyclic shift from a group (e.g., the set) of non-used cyclic shifts to use for its initial PSCCH transmission. The group of non-used cyclic shifts may include the list of available cyclic shifts (e.g., {0, 3, 6, 9}) excluding the cyclic shift used by the other UEs to send its PSCCH retransmission. For example, if the other UE uses a cyclic shift of 3 to send its PSCCH retransmission, then the UE may randomly select a cyclic shift from the remaining set of non-used cyclic shifts {0, 6, 9} to use for its initial PSCCH transmission.

Figure 10:
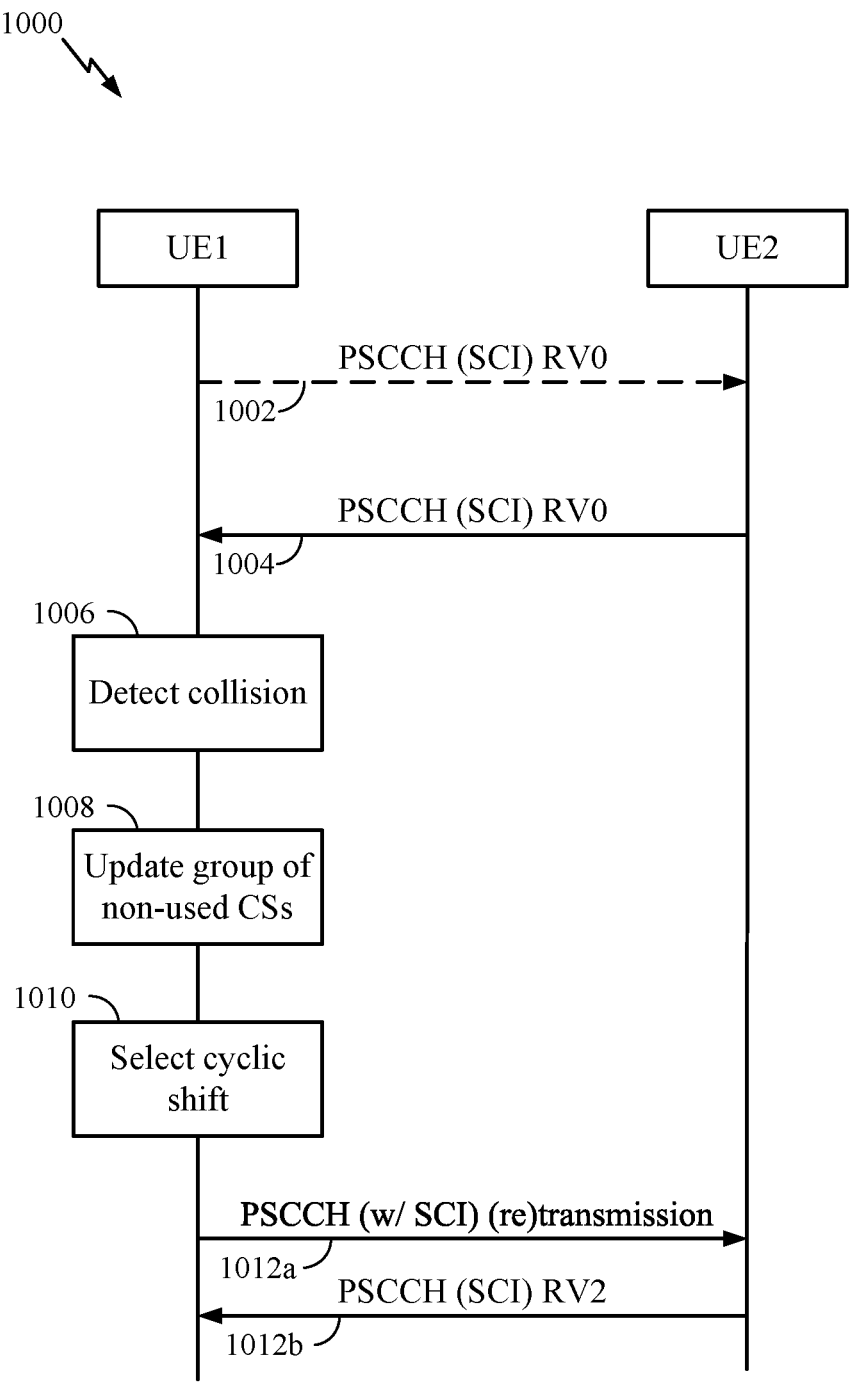
FIG. 10 is a call flow diagram illustrating example signaling for cyclic shift selection for physical sidelink control channel (PSCCH) retransmission, in accordance with aspects of the present disclosure.

FIG. 10 is a call flow illustrating example signaling 1000 between a UE1 and a UE2, in accordance with certain aspects of the present disclosure. At 1002, the UE1 may send to UE2 a $RV_0$ PSCCH transmission, which may provide SCI and information about the physical sidelink shared channel (PSSCH) $RV_0$ transmission. At 1004, the UE1 receives from UE2 a $RV_0$ PSCCH transmission. After receiving the PSCCH RV0 from the UE2 at 1004, then at 1008, the UE1 may update the group of non-used cyclic shifts to exclude the cyclic shift used by UE2 to send UE2's PSCCH transmission (at 1004).

At 1006, the UE1 may detect a collision based on the SCI received from the UE2 (at 1004). For example, the SCI from the UE2 may point to the retransmission of the SCI on the PSCCH at 1012b. The UE1 may detect that the UE1 has a colliding PSCCH transmission or retransmission at 1012a.

According to certain aspects, the UE1 may select, at 1010, the cyclic shift for its colliding PSCCH transmission at 1012a based the determination.

In some aspects, if the UE (e.g., UE1 of FIG. 10) is sending a PSCCH retransmission (e.g., $RV_2$ at 1012a), that collides with the PSCCH retransmission by another UE (e.g., $RV_2$ at 1012b), then the cyclic shift selected by the UE may depend on whether the cyclic shift used for the corresponding initial PSCCH transmission (e.g., RV0 at 1002) by the UE is contained in the group of non-used cyclic shifts.

If the cyclic shift selected that was used for the initial PSCCH transmission (e.g., at 1002) is contained in the group of non-used cyclic shifts, the UE may select (e.g., at 1010) the same cyclic shift for the PSCCH retransmission (e.g., at 1012a). That is, if the cyclic shift used for the initial transmission by the UE is different than the cyclic shift of any colliding PSCCH retransmission by another UE, then the cyclic shift used for the initial transmission by the UE can be reused for the corresponding retransmission. On the other hand, if the cyclic shift used for the initial PSCCH transmission by the UE is not contained in the group of non-used cyclic shifts, then the UE may randomly select the cyclic shift for the retransmission by the UE from the group of non-used cyclic shifts. That is, if the cyclic shift used for the initial transmission by the UE is the same as the cyclic shift of any colliding PSCCH retransmission by another UE, then the cyclic shift used for the initial transmission by the UE cannot be reused for the corresponding retransmission. In some aspects, if the cyclic shift used for the initial PSCCH transmission by the UE is not contained in the group of non-used cyclic shifts, then the UE may select the same cyclic shift for the retransmission by the UE as used for the initial transmission by the UE, which was randomly selected. In other words, when there is a collision, the UE may either randomly select from the non-used CSs or may select the same CS used for the RV0 transmission.

In some aspects, the cyclic shift selection approach described above may be activated or deactivated. For example, the UE may perform the above cyclic shift selection for the PSCCH retransmissions when observing congestion (i.e. as a congestion control mechanism), such as when congestion reaches a defined threshold.

Aspects of the present disclosure may be detected when transmitting an HARQ pair ($RV_0$ and $RV_2$ pair). In some examples, the UE may transmit $RV_0$ and $RV_2$ continuously, and accordingly, the majority of $RV_0$ and $RV_2$ transmissions may have the same cyclic shift. With a random selection of cyclic shifts, transmissions have about a 25% chance of collision.

Aspects of the present disclosure may be detected when transmitting $RV_0$ on a resource with an overlapped $RV_2$(s). For example, a first UE supporting same cyclic shift transmission may continuously transmit an HARQ pair (with same cyclic shift), and the second UE continuously transmits $RV_0$ colliding with $RV_2$. Accordingly, aspects of the present disclosure may not use the same cyclic shift for the initial PSCCH transmission, while with a purely random selection of cyclic shifts, the cyclic shifts will be evenly distributed.

Figure 11:
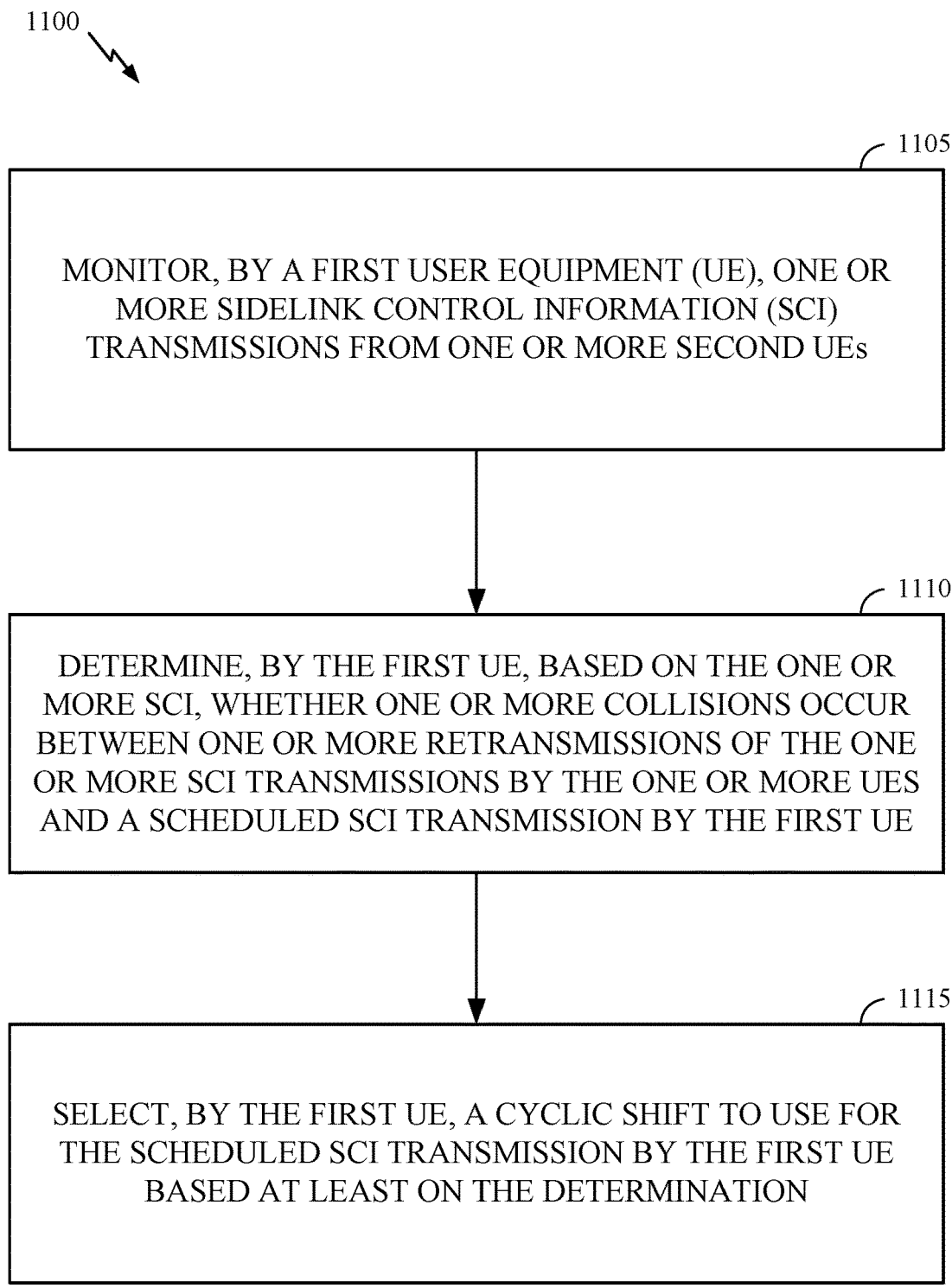
FIG. 11 is a flow diagram illustrating example operations for wireless communication by a UE, in accordance with certain aspects of the present disclosure.

FIG. 11 is a flow diagram illustrating example operations 1100 for wireless communication, in accordance with certain aspects of the present disclosure. The operations 1100 may be performed, for example, by a first UE (e.g., such as a UE 120a in the wireless communication network 100). Operations 1100 may be implemented as software components that are executed and run on one or more processors (e.g., controller/processor 280 of FIG. 2). Further, the transmission and reception of signals by the UE in operations 1000 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1100 may begin, at 1105, by monitoring one or more SCI transmissions for one or more second UEs. For example, the first UE may monitor one or more PSCCHs for SCI from one or more sidelink UEs.

At 1110, the first UE determines, based on the one or more SCI, whether one or more collisions occur between one or more retransmissions of the one or more SCI transmissions by the one or more second UEs and a scheduled SCI transmission by the first UE. Determining whether the one or more collision occurs may involve the first UE determining, based on the SCI transmissions from the one or more second UEs, time and frequency resources for the one or more retransmissions of the one or more SCI transmissions by the one or more second UEs. The first UE may determine that a collision occurs when the same time and frequency resources are used (e.g., scheduled, allocated, or indicated) for the scheduled SCI transmission by the first UE as the time and frequency resources for the one or more retransmissions of the one or more SCI transmissions by the one or more second UEs. The first UE may determine that a collision does not occur when the scheduled SCI transmission by the first UE uses different time and/or frequency resources than the time and frequency resources for the one or more retransmissions by the one or more second UEs.

At 1115, the first UE selects a cyclic shift to use for the scheduled SCI transmission by the first UE based on at least on the determination.

According to some aspects, when the first UE determines that a collision does not occur, then selecting the cyclic shift to use for the scheduled SCI transmission by the first UE involves randomly selecting the cyclic shift from a set of a plurality of cyclic shifts for an initial transmission by the first UE, and selecting the cyclic shift randomly selected for the initial transmission for a retransmission by the first UE.

According to some aspects, when the first UE determines that a collision occurs, the first UE determines one or more cyclic shifts used for the one or more retransmissions of the one or more SCI transmission by the one or more second UEs based on one or more cyclic shifts used for the one or more SCI transmissions by the one or more second UEs.

In some aspects, selecting the cyclic shift to use for the scheduled SCI transmission by the first UE comprises randomly selecting a cyclic shift from a set of a plurality of cyclic shifts excluding the determined one or more cyclic shift used for the one or more retransmissions of the SCI by the one or more second UEs that collide with the scheduled SCI transmission by the first UE, when the scheduled transmission is an initial transmission.

In some aspects, selecting the cyclic shift to use for the scheduled SCI transmission by the first UE comprises selecting a same cyclic shift used for an initial transmission by the first UE when the scheduled SCI transmission is a retransmission, and a cyclic shift used for the initial transmission is different from the determined one or more cyclic shifts for the one or more retransmissions of the one or more SCI transmission by the one or more second UEs.

In some aspects, selecting the cyclic shift to use for the scheduled SCI transmission by the first UE comprises randomly selecting the cyclic shift, from a set of plurality of cyclic shifts excluding the determined one or more cyclic shifts used for the one or more retransmission of the one or more SCI transmissions by the one or more second UEs that collide with the scheduled SCI transmission by the first UE, when the scheduled SCI transmission is a retransmission and a cyclic shift used for an initial transmission is the same as at least one of the determined one or more cyclic shifts for the one or more retransmissions of the one or more SCI transmissions by the one or more second UEs.

In some aspects, when the scheduled SCI transmission is a retransmission and a cyclic shift used for an initial transmission is the same as at least one of the determined one or more cyclic shifts for the one or more transmissions of the one or more SCI transmissions by the one or more second UEs, selecting the cyclic shift to use for the scheduled SCI transmission by the first UE comprises selecting a same cyclic shift used for an initial transmission by the first UE or randomly selecting the cyclic shift from a set of a plurality of cyclic shifts excluding the determined one or more cyclic shifts used for the one or more retransmissions of the one or more SCI transmissions by the one or more second UEs that collide with the scheduled SCI transmission by the first UE.

In some aspects, selecting the cyclic shift to use for the scheduled SCI transmission by the first UE comprises determining a technique for selecting the cyclic shift based on whether a detected level of congestion is at or above a congestion threshold level.

In some aspects, a transmission by either the first UE or the second UE is associated with a first redundancy version ($RV_0$), and a retransmission by the first UE or the second UE corresponding to the first SCI transmission is associated with a second redundancy version ($RV_2$).

In some aspects, the first UE and the one or more second UEs are configured for C-V2X communications, and the first UE monitors for the one or more SCI transmissions from the one or more second UEs in a physical sidelink control channel (PSCCH) in a subframe. In further aspects, the first UE and the one or more second UEs are configured for a transmission mode 4 for the C-V2X communications, and the first UE and the one or more second UEs autonomously select transmission resources.

Figure 12:
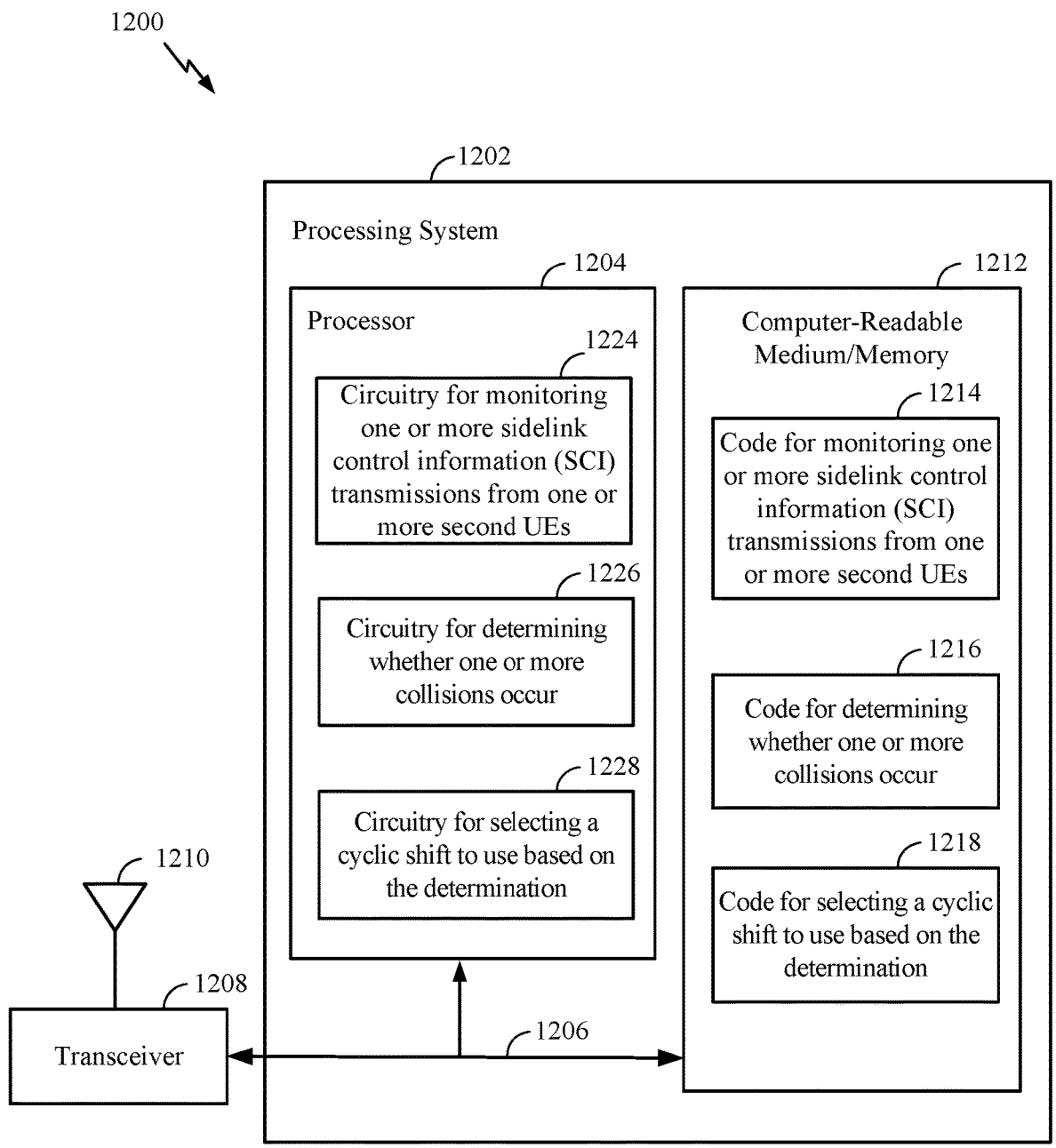
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 11. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 11, or other operations for performing the various techniques discussed herein for cyclic shift selection for PSCCH transmissions. In certain aspects, computer-readable medium/memory 1212 stores code 1214 for monitoring one or more SCI transmissions from one or more UEs; code 1216 for determining, based on the one or more SCI, whether one or more retransmissions of the one or more SCI transmissions by the one or more second UEs and a scheduled SCI transmission by the first UE; and code 1218 for selecting a cyclic shift for the scheduled SCI transmission by the first UE based at least on the determination, in accordance with aspect of the disclosure. In certain aspects, the processor 1204 has circuitry configured to implement the code stored in the computer-readable medium/memory 1212. The processor 1204 includes circuitry 1214 for monitoring one or more SCI transmissions from one or more second UEs; circuitry 1216 for determining, based on the one or more SCI, whether one or more collisions occur between one or more retransmissions of the one or more SCI transmissions by the one or more second UEs and a scheduled SCI transmission by the first UE; and circuitry 1218 for selecting a cyclic shift to use for the scheduled SCI transmission by the first UE based at least on the determination, in accordance with aspects of the disclosure.

Example Aspects

In a first aspect, a method for wireless communication by a first user equipment (UE), includes monitoring one or more sidelink control information (SCI) transmissions from one or more second UEs; determining, based on the one or more SCI, whether one or more collisions occur between one or more retransmissions of the one or more SCI transmissions by the one or more second UEs and a scheduled SCI transmission by the first UE; and selecting a cyclic shift to use for the scheduled SCI transmission by the first UE based at least on the determination.

In a second aspect, in combination with the first aspect, determining whether the one or more collisions occur includes determining, based on the SCI transmission, time and frequency resources for the one or more retransmissions of the one or more SCI transmission by the one or more second UEs; and determining the same time and frequency resources for the scheduled SCI transmission by the first UE.

In a third aspect, in combination with any of the first and second aspects, determining whether the one or more collisions occur includes determining that a collision does not occur; and selecting the cyclic shift to use for the scheduled SCI transmission by the first UE includes randomly selecting the cyclic shift, from a set of a plurality of cyclic shifts, for an initial transmission by the first UE; and selecting the cyclic shift that was randomly selected for the initial transmission for a retransmission by the first UE.

In a fourth aspect, in a combination with any of the first through third aspects, the determining whether the one or more collisions occur includes determining that the one or more collisions occur; and the method further comprises determining one or more cyclic shifts used for the one or more retransmissions of the one or more SCI transmissions by the one or more second UEs based on one or more cyclic shifts used for the one or more SCI transmissions by the one or more second UEs.

In a fifth aspect, in a combination with the fourth aspect, selecting the cyclic shift to use for the scheduled SCI transmission by the first UE includes randomly selecting a cyclic shift, from a set of a plurality of cyclic shifts excluding the determined one or more cyclic shifts used for the one or more retransmissions of the one or more SCI transmissions by the one or more second UEs that collide with the scheduled SCI transmission by the first UE, when the scheduled SCI transmission is an initial transmission.

In a sixth aspect, in a combination with any of the fourth or fifth aspects, selecting the cyclic shift to use for the scheduled SCI transmission by the first UE includes selecting a same cyclic shift used for an initial transmission by the first UE when the scheduled SCI transmission is a retransmission and a cyclic shift used for the initial transmission is different than the determined one or more cyclic shifts for the one or more retransmissions of the one or more SCI transmission by the one or more second UEs.

In a seventh aspect, in combination with any of the fourth through sixth aspects, when the scheduled SCI transmission is a retransmission and a cyclic shift used for an initial transmission is the same as at least one of the determined one or more cyclic shifts for the one or more retransmissions of the one or more SCI transmissions by the one or more second UEs, selecting the cyclic shift to use for the scheduled SCI transmission by the first UE includes selecting a same cyclic shift used for an initial transmission by the first UE, or randomly selecting the cyclic shift, from a set of a plurality of cyclic shifts excluding the determined one or more cyclic shifts used for the one or more retransmissions of the one or more SCI transmissions by the one or more second UEs that collide with the scheduled SCI transmission by the first UE.

In an eighth aspect, in combination with any of the first through seventh aspects, selecting the cyclic shift includes determining a technique for selecting the cyclic shift based on whether a detected level of congestion is at or above a congestion threshold level.

In a ninth aspect, in combination with any of the first through eighth aspects, a transmission is associated with a first redundancy version (RV0), and a retransmission corresponding the first SCI transmission is associated with a second RV (RV2).

In a tenth aspect, in combination with any of the first through ninth aspects, the first UE and the one or more second UEs are configured for cellular vehicle-to-anything (C-V2X) communications; and the first UE monitors for the one or more SCI transmissions from the one or more second UEs in a physical sidelink control channel (PSCCH) in a subframe.

In an eleventh aspect, in combination with any of the tenth aspect, the first UE and the one or more second UEs are configured for a transmission mode 4 for the C-V2X communications, and wherein the first UE and the one or more second UEs autonomously select transmission resources.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a first user equipment (UE), comprising:
    monitoring one or more sidelink control information (SCI) transmissions from one or more second UEs;
    determining, based on the one or more SCI, whether one or more collisions occur between one or more retransmissions of the one or more SCI transmissions by the one or more second UEs and a scheduled SCI transmission by the first UE; and
    selecting a cyclic shift to use for the scheduled SCI transmission by the first UE based at least on the determination,
    wherein determining whether the one or more collisions occur comprises:
    determining, based on the one or more SCI transmissions by the one or more second UEs, time and frequency resources for the one or more retransmissions of the one or more SCI transmissions by the one or more second UEs; and
    determining that the one or more collisions occur when determining the same time and frequency resources for the scheduled SCI transmission by the first UE.

2. The method of claim 1, wherein:
    determining whether the one or more collisions occur comprises determining that a collision does not occur; and
    selecting the cyclic shift to use for the scheduled SCI transmission by the first UE comprises:
    randomly selecting the cyclic shift, from a set of a plurality of cyclic shifts, for an initial transmission by the first UE; and
    selecting the cyclic shift that was randomly selected for the initial transmission for a retransmission by the first UE.

3. The method of claim 1, wherein:
    the determining whether the one or more collisions occur comprises determining that the one or more collisions occur; and
    the method further comprises determining one or more cyclic shifts used for the one or more retransmissions of the one or more SCI transmissions by the one or more second UEs based on one or more cyclic shifts used for the one or more SCI transmissions by the one or more second UEs.

4. The method of claim 3, wherein selecting the cyclic shift to use for the scheduled SCI transmission by the first UE comprises randomly selecting a cyclic shift, from a set of a plurality of cyclic shifts excluding the determined one or more cyclic shifts used for the one or more retransmissions of the one or more SCI transmissions by the one or more second UEs that collide with the scheduled SCI transmission by the first UE, when the scheduled SCI transmission is an initial transmission.

5. The method of claim 3, wherein selecting the cyclic shift to use for the scheduled SCI transmission by the first UE comprises selecting a same cyclic shift used for an initial transmission by the first UE when the scheduled SCI transmission is a retransmission and a cyclic shift used for the initial transmission is different than the determined one or more cyclic shifts for the one or more retransmissions of the one or more SCI transmission by the one or more second UEs.

6. The method of claim 3, wherein, when the scheduled SCI transmission is a retransmission and a cyclic shift used for an initial transmission is the same as at least one of the determined one or more cyclic shifts for the one or more retransmissions of the one or more SCI transmissions by the one or more second UEs, selecting the cyclic shift to use for the scheduled SCI transmission by the first UE comprises:
selecting a same cyclic shift used for an initial transmission by the first UE, or randomly selecting the cyclic shift, from a set of a plurality of cyclic shifts excluding the determined one or more cyclic shifts used for the one or more retransmissions of the one or more SCI transmissions by the one or more second UEs that collide with the scheduled SCI transmission by the first UE.

7. The method of claim 1, wherein selecting the cyclic shift comprises determining a technique for selecting the cyclic shift based on whether a detected level of congestion is at or above a congestion threshold level.

8. The method of claim 1, wherein a transmission is associated with a first redundancy version ($RV_0$), and a retransmission corresponding to a first SCI transmission of the one or more SCI transmissions is associated with a second RV ($RV_2$).

9. The method of claim 1, wherein:
the first UE and the one or more second UEs are configured for cellular vehicle-to-anything (C-V2X) communications; and
the first UE monitors for the one or more SCI transmissions from the one or more second UEs in a physical sidelink control channel (PSCCH) in a subframe.

10. The method of claim 9, wherein the first UE and the one or more second UEs are configured for a transmission mode 4 for the C-V2X communications, and wherein the first UE and the one or more second UEs autonomously select transmission resources.

11. An apparatus for wireless communication, comprising:
at least one processor; and
a memory coupled to the at least one processor, the memory comprising code executable by the at least one processor to cause the apparatus to:
monitor one or more sidelink control information (SCI) transmissions from one or more user equipments (UEs);
determine, based on the one or more SCI, whether one or more collisions occur between one or more retransmissions of the one or more SCI transmissions by the one or more UEs and a scheduled SCI transmission by the apparatus; and
select a cyclic shift to use for the scheduled SCI transmission by the apparatus based at least on the determination,
wherein the code to cause the apparatus to determine whether the one or more collisions occur comprises code to cause the apparatus to:
determine, based on the one or more SCI transmissions by the one or more UEs, time and frequency resources for the one or more retransmissions of the one or more SCI transmissions by the one or more UEs; and
determine that the one or more collisions occur when determining the same time and frequency resources for the scheduled SCI transmission by the apparatus.

12. The apparatus of claim 11, wherein:
the code to cause the apparatus to determine whether the one or more collisions occur comprises code to cause the apparatus to determine that a collision does not occur; and
the code to cause the apparatus to select the cyclic shift to use for the scheduled SCI transmission by the apparatus comprises code to cause the apparatus to:
randomly select the cyclic shift, from a set of a plurality of cyclic shifts, for an initial transmission by the apparatus; and
select the cyclic shift that was randomly selected for the initial transmission for a retransmission by the apparatus.

13. The apparatus of claim 11, wherein:
the code to cause the apparatus to determine whether the one or more collisions occur comprises code to cause the apparatus to determine that the one or more collisions occur; and
the memory further comprises code to cause the apparatus to determine one or more cyclic shifts used for the one or more retransmissions of the one or more SCI transmissions by the one or more UEs based on one or more cyclic shifts used for the one or more SCI transmissions by the one or more UEs.

14. The apparatus of claim 13, wherein the code to cause the apparatus to select the cyclic shift to use for the scheduled SCI transmission by the apparatus comprises code to cause the apparatus to randomly select a cyclic shift, from a set of a plurality of cyclic shifts excluding the determined one or more cyclic shifts used for the one or more retransmissions of the one or more SCI transmissions by the one or more UEs that collide with the scheduled SCI transmission by the apparatus, when the scheduled SCI transmission is an initial transmission.

15. The apparatus of claim 13, wherein the code to cause the apparatus to select the cyclic shift to use for the scheduled SCI transmission by the apparatus comprises code to cause the apparatus to select a same cyclic shift used for an initial transmission by the apparatus when the scheduled SCI transmission is a retransmission and a cyclic shift used for the initial transmission is different than the determined one or more cyclic shifts for the one or more retransmissions of the one or more SCI transmission by the one or more UEs.

16. The apparatus of claim 13, wherein, when the scheduled SCI transmission is a retransmission and a cyclic shift used for an initial transmission is the same as at least one of the determined one or more cyclic shifts for the one or more retransmissions of the one or more SCI transmissions by the one or more UEs, the code to cause the apparatus to select the cyclic shift to use for the scheduled SCI transmission by the apparatus comprises code to cause the apparatus to:
- select a same cyclic shift used for an initial transmission by the apparatus, or
- randomly select the cyclic shift, from a set of a plurality of cyclic shifts excluding the determined one or more cyclic shifts used for the one or more retransmissions of the one or more SCI transmissions by the one or more UEs that collide with the scheduled SCI transmission by the apparatus.

17. The apparatus of claim 11, wherein the code to cause the apparatus to select the cyclic shift comprises code to cause the apparatus to determine a technique for selecting the cyclic shift based on whether a detected level of congestion is at or above a congestion threshold level.

18. The apparatus of claim 11, wherein a transmission is associated with a first redundancy version ($RV_0$), and a retransmission corresponding to a first SCI transmission of the one or more SCI transmissions is associated with a second RV ($RV_2$).

19. The apparatus of claim 11, wherein:
- the apparatus and the one or more UEs are configured for cellular vehicle-to-anything (C-V2X) communications; and
- the memory further comprises code to cause the apparatus to monitor for the one or more SCI transmissions from the one or more UEs in a physical sidelink control channel (PSCCH) in a subframe.

20. The apparatus of claim 19, wherein the apparatus and the one or more UEs are configured for a transmission mode 4 for the C-V2X communications, and wherein the apparatus and the one or more UEs autonomously select transmission resources.

21. An apparatus for wireless communication, comprising:
- means for monitoring one or more sidelink control information (SCI) transmissions from one or more user equipment (UEs);
- means for determining, based on the one or more SCI, whether one or more collisions occur between one or more retransmissions of the one or more SCI transmissions by the one or more UEs and a scheduled SCI transmission by the apparatus; and
- means for selecting a cyclic shift to use for the scheduled SCI transmission by the apparatus based at least on the determination,
- wherein the means for determining whether the one or more collisions occur comprises:
- means for determining, based on the one or more SCI transmissions by the one or more UEs, time and frequency resources for the one or more retransmissions of the one or more SCI transmissions by the one or more UEs; and
- means for determining that the one or more collisions occur when determining the same time and frequency resources for the scheduled SCI transmission by the apparatus.

22. The apparatus of claim 21, wherein:
- means for determining whether the one or more collisions occur comprises means for determining that a collision does not occur; and
- means for selecting the cyclic shift to use for the scheduled SCI transmission by the apparatus comprises:
  - means for randomly selecting the cyclic shift, from a set of a plurality of cyclic shifts, for an initial transmission by the apparatus; and
  - means for selecting the cyclic shift that was randomly selected for the initial transmission for a retransmission by the apparatus.

23. The apparatus of claim 21, wherein:
- the means for determining whether the one or more collisions occur comprises means for determining that the one or more collisions occur; and
- the apparatus further comprises means for determining one or more cyclic shifts used for the one or more retransmissions of the one or more SCI transmissions by the one or more UEs based on one or more cyclic shifts used for the one or more SCI transmissions by the one or more UEs.

24. The apparatus of claim 23, wherein the means for selecting the cyclic shift to use for the scheduled SCI transmission by the apparatus comprises means for randomly selecting a cyclic shift, from a set of a plurality of cyclic shifts excluding the determined one or more cyclic shifts used for the one or more retransmissions of the one or more SCI transmissions by the one or more UEs that collide with the scheduled SCI transmission by the apparatus, when the scheduled SCI transmission is an initial transmission.

25. The apparatus of claim 23, wherein the means for selecting the cyclic shift to use for the scheduled SCI transmission by the apparatus comprises means for selecting a same cyclic shift used for an initial transmission by the apparatus when the scheduled SCI transmission is a retransmission and a cyclic shift used for the initial transmission is different than the determined one or more cyclic shifts for the one or more retransmissions of the one or more SCI transmission by the one or more UEs.

26. The apparatus of claim 23, wherein, when the scheduled SCI transmission is a retransmission and a cyclic shift used for an initial transmission is the same as at least one of the determined one or more cyclic shifts for the one or more retransmissions of the one or more SCI transmissions by the one or more UEs, the means for selecting the cyclic shift to use for the scheduled SCI transmission by the apparatus comprises:
- means for selecting a same cyclic shift used for an initial transmission by the apparatus, or
- means for randomly selecting the cyclic shift, from a set of a plurality of cyclic shifts excluding the determined one or more cyclic shifts used for the one or more retransmissions of the one or more SCI transmissions by the one or more UEs that collide with the scheduled SCI transmission by the apparatus.

27. A non-transitory computer readable medium storing computer executable code thereon for wireless communication by a first user equipment (UE), comprising:
- code for monitoring one or more sidelink control information (SCI) transmissions from one or more second UEs;
- code for determining, based on the one or more SCI, whether one or more collisions occur between one or more retransmissions of the one or more SCI transmissions by the one or more second UEs and a scheduled SCI transmission by the first UE; and
- code for selecting a cyclic shift to use for the scheduled SCI transmission by the first UE based at least on the determination,
- wherein the code for determining whether the one or more collisions occur comprises:
- code for determining, based on the one or more SCI transmissions by the one or more second UEs, time and frequency resources for the one or more retransmissions of the one or more SCI transmissions by the one or more second UEs; and code for determining that the one or more collisions occur when determining the same time and frequency resources for the scheduled SCI transmission by the first UE.

* * * * *